US007139902B2

(12) United States Patent
Lee (10) Patent No.: US 7,139,902 B2
(45) Date of Patent: Nov. 21, 2006

(54) IMPLEMENTATION OF AN EFFICIENT INSTRUCTION FETCH PIPELINE UTILIZING A TRACE CACHE

(75) Inventor: Yung-hsiang Lee, Aliso Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 529 days.

(21) Appl. No.: 10/356,984

(22) Filed: Feb. 3, 2003

(65) Prior Publication Data
US 2004/0083352 A1 Apr. 29, 2004

Related U.S. Application Data

(60) Provisional application No. 60/422,149, filed on Oct. 29, 2002.

(51) Int. Cl.
G06F 9/32 (2006.01)
(52) U.S. Cl. .............. 712/234; 712/233; 712/235; 712/205
(58) Field of Classification Search ........ 712/233–235, 712/205, 219; 711/120, 125
See application file for complete search history.

(56) References Cited

U.S. PATENT DOCUMENTS 4,722,050 A * 1/1988 Lee et al. ............... 712/205
4,974,155 A * 11/1990 Dulong et al. ............ 712/219

OTHER PUBLICATIONS

Rotenberg, Eric et al. "Trace Cache: a Low Latency Approach to High Bandwidth Instruction Fetching." IEEE: 1996.*
Rotenberg. Eric et al. "Trace Cache: a Low Latency Approach to High Bandwidth Instruction Fetching." IEEE: 1996.*
Hinton, Glenn et al. "A 0.18um CMOS IA-32 Processor With a 4-GHz Integer Execution Unit." IEEE: 2001.*
Andreas Moshovos & Gurindar S. Sohi, Microarchitectural Innovations: Boosting Microprocessor Performance Beyond Semiconductor Technology Scaling, Proceedings of the IEEE, vol. 89, No. 11, Nov. 2001, pp. 1560-1575, The Institute of Electrical & Electronics Engineers, USA.
Roni Rosner, Avi Mendelson & Ronny Ronen, Filtering Techniques to Improve Trace-Cache Efficiency, IEEE proceedings of 2001 International Conference on Parallel Architectures and Compilation Techniques, 2001, pp. 37-48, The Institute of Electrical & Electronics Engineers, USA.
Quinn Jacobson & James E. Smith, Trace Preconstruction, IEEE proceedings of the 27th International Symposium on Computer Architecture (ISCA), Jun. 2000, pp. 37-46, The Institute of Electrical & Electronics Engineers, USA.
Matthew C. Merten, Andrew R. Trick, Erik N. Nystrom, Ronald D. Barnes, Wen-Mei W. Hwu, A Hardware Mechanism for Dynamic Extraction and Relayout of Program Hot Spots, IEEE proceedings of the 27th International Symposium on Computer Architecture (ISCA), Jun. 2000, pp. 59-70, The Institute of Electrical & Electronics Engineers, USA.

(Continued)

*Primary Examiner*—Eddie Chan
*Assistant Examiner*—Ryan Fiegle
(74) *Attorney, Agent, or Firm*—McAndrews, Held & Malloy, Ltd.

(57) ABSTRACT

A method and apparatus are disclosed for enhancing the pipeline instruction transfer and execution performance of a computer architecture by reducing instruction stalls due to branch and jump instructions. Trace cache within a computer architecture is used to receive computer instructions at a first rate and to store the computer instructions as traces of instructions. An instruction execution pipeline is also provided to receive, decode, and execute the computer instructions at a second rate that is less than the first rate. A mux is also provided between the trace cache and the instruction execution pipeline to select a next instruction to be loaded into the instruction execution pipeline from the trace cache based, in part, on a branch result fed back to the mux from the instruction execution pipeline.

20 Claims, 8 Drawing Sheets

OTHER PUBLICATIONS

Ryan Rakvic, Bryan Black, & John Paul Shen, Completion Time Multiple Branch Prediction for Enhancing Trace Cache Performance, IEEE proceedings of the 27th International Symposium on Computer Architecture (ISCA), Jun. 2000, pp. 47-58, The Institute of Electrical & Electronics Engineers, USA.

Yuan Chou & John Paul Shen, Instruction Path Coprocessors, IEEE proceedings of the 27th International Symposium on Computer Architecture (ISCA), Jun. 2000, pp. 270-281, The Institute of Electrical & Electronics Engineers, USA.

Alex Ramirez, Josep Li. Larriba-Pey & Mateo Valero, Trace Cache Redundancy: Red & Blue Traces*, IEEE Proceedings of 6$^{th}$ International Symposium on High Performance Computer Architecture, Jan. 2000, pp. 325-333, The Institute of Electrical & Electronics Engineers, USA.

Stephen Jourdan, Lihu Rappoport, Yoav Almog, Mattan Erez, Adi Yoaz, & Ronny Ronen, eXtended Block Cache, IEEE Proceedings of 6th International Symposium on High Performance Computer Architecture, Jan. 2000, pp. 61-70, The Institute of Electrical & Electronics Engineers, USA.

Sanjay Jeram Patel, Daniel Holmes Friendly & Yale N. Patt, Evaluation of Design Options for the Trace Cache, IEEE Transactions on Computers a Special Issue on Cache Memory and Related Problems, vol. 48, No. 2, Feb. 1999, pp. 193-204, The Institute of Electrical & Electronics Engineers, USA.

Bryan Black, Bohuslav Rychlik, & John Paul Shen, The Block-based Trace Cache, IEEE Proceedings of the 26th Annual International Symposium on Computer Architecture, May 1999, pp. 196-207, The Institute of Electrical & Electronics Engineers, USA.

Daniel Holmes Friendly, Sanjay Jeram Patel, & Yale N. Patt, Putting the Fill Unit to Work: Dynamic Optimizations for Trace Cache Miroprocessors, IEEE Proceedings of the 31st Symposium on Microarchitecture, 1998, pp. 173-181, The Institute of Electrical & Electronics Engineers, USA.

Sanjay Jeram Patel, Marius Evers & Yale N. Patt, Improving Trace Cache Effectiveness with Branch Promotion and Trace Packing, IEEE proceedings of the 25th Annual International Symposium of Computer Architecture, 1998, pp. 262-271, The Institute of Electrical & Electronics Engineers, USA.

Mikko H. Lipasti & John Paul Shen, Superspeculative Microarchitecture for Beyond AD 2000, Computer, vol. 30, No. 9, Sep. 1997, pp. 59-66, The Institute of Electrical & Electronics Engineers, USA.

Quinn Jacobson, Eric Rotenberg & James E. Smith, Path-Based Next Trace Prediction, IEEE Proceedings of the 30th Annual IEEE/ACM International Symposium on Microarchitecture, 1997, pp. 14-23, The Institute of Electrical & Electronics Engineers, USA.

Eric Rotenberg, Steve Bennett & James E. Smith, Trace Cache: A Low Latency Approach to High Bandwith Instruction Fetching, IEEE Proceedings of the 29th Annual IEEE/ACM International Symposium on Microarchitecture, 1996, pp. 24-34, The Institute of Electrical & Electronics Engineers, USA.

* cited by examiner

FIG. 5 instruction sequence (even) $A^*_0$ (odd) $B_0$ (even) $C^*_0$     $C^*_1$ (odd) $D_0$     $D_1$ Ideally, when $A^*_0$ is executed, trace cache is loaded with $C^*_0$ and $C^*_1$.

$B_0$ is executed after $A^*_0$ (assuming a single branch delay slot) and then either $C^*_0$ or $C^*_1$ is executed based on the outcome of $A^*_0$.

* indicates a branch instruction

FIG. 6

| clock cycle 1 | clock cycle 2 | clock cycle 3 | clock cycle 4 | clock cycle 5 | clock cycle 6 | clock cycle 7 | clock cycle 8 |
|---|---|---|---|---|---|---|---|
| possible sequences of instructions | | | | | | | |
| | | | | | | $G_5$ | $H_5$ |
| | | | | $E^*_3$ | $F_3$ | $G_3$ | $H_3$ |
| | | | | | | $G_4$ | $H_4$ |
| $A^*_0$ | $B_0$ | $C^*_0$ $C^*_1$ | $D_0$ $D_1$ | $E_0$ $E^*_1$ | $F_0$ $F_1$ | $G_1$ | $H_1$ |
| | | | | $E_2$ | $F_2$ | | |

\* indicates a branch instruction

IMPLEMENTATION OF AN EFFICIENT INSTRUCTION FETCH PIPELINE UTILIZING A TRACE CACHE

CROSS-REFERENCE TO RELATED APPLICATIONS/INCORPORATION BY REFERENCE

This application also makes reference to, claims priority to and claims the benefit of U.S. provisional patent application serial No. 60/422,149 filed on Oct. 29, 2002.

BACKGROUND OF THE INVENTION

In modern computer architectures, trace cache is often used to attempt to reduce branch penalty cycles caused by a mis-prediction of branch instructions and to de-couple the latency associated with any unconditional jumps.

Trace cache is typically used to store traces of instructions to be executed, one after another, in a pipelined instruction execution architecture. Different traces may correspond to different possible sequences of instructions that may or may not be executed depending on conditional outcomes of certain instructions such as branch instructions or outcomes of unconditional jump instructions.

A branch instruction is a computer instruction that may have two possible outcomes. The two outcomes are branch or don't branch. When the result of a branch instruction is to branch, then the instruction architecture abandons the current instruction sequence and branches to a different instruction sequence. When the result is not to branch, the instruction architecture stays on the same instruction sequence path.

In the case of an unconditional jump instruction, when the jump instruction is executed, the instruction architecture always jumps to the new instruction sequence associated with the jump instruction.

In either case, conditional branch or unconditional jump, delays may be encountered in the instruction execution pipeline if the computer architecture must go further back in the instruction pipeline to access the next sequence of instructions to branch to or jump to. These delays effectively cause stalls in the instruction execution pipeline while the instruction execution pipeline waits for the next correct instruction to be loaded into its instruction register.

In a typical instruction pipeline within a computer architecture, an instruction cache grabs computer instructions from a memory. The instruction cache may feed individual instructions into an instruction register or may feed a trace cache to build up traces of instructions within the trace cache. Once an instruction is loaded into an instruction register, it is decoded and executed using associated data loaded into a data register for that instruction. The result of the executed instruction is written back to a register.

A typical instruction pipeline in a computer architecture may use a branch predictor to attempt to predict the outcome of a branch instruction based on a trace history built up in trace cache. Prediction accuracies of 90% or better may be achieved. However, for those instances when the branch prediction is incorrect, additional delays and stalls may be experienced.

Research with respect to trace cache has focused on various implementation details such as how to construct continuous traces, using single or multiple branch predictors to improve the trace cache performance, and filling algorithms for loading the trace cache. Also, instead of constructing multiple branch predictors, multiple branches of traces may be constructed in trace cache.

The circuit delay associated with a branch mis-prediction may then be reduced by going back only to trace cache and accessing the correct trace instead of suffering additional delays by having to go back to the instruction cache or the memory. The only delay suffered is then just that associated with the mis-prediction into trace cache. Therefore, by constructing parallel branches of traces in trace cache, the circuit delay from making the branch decision to the instruction fetch may be reduced. However, instruction execution pipeline stalls may still occur with such a configuration (when the branch prediction is incorrect).

It is desirable to further reduce the chance of delays and stalls occurring in the instruction execution pipeline of a computer architecture. It is also desirable to eliminate the branch predictor altogether such that only correct instructions/traces are loaded into the instruction execution pipeline.

Further limitations and disadvantages of conventional and traditional approaches will become apparent to one of skill in the art, through comparison of such systems with embodiments of the present invention as set forth in the remainder of the present application with reference to the drawings.

BRIEF SUMMARY OF THE INVENTION

Certain embodiments of the present invention provide a method and apparatus to enhance the performance of a computer architecture. In particular, certain embodiments provide for reducing instruction execution pipeline stalls due to branch instructions and jump instructions executed by the computer architecture.

A method of the present invention provides an instruction transfer bandwidth between an instruction cache and a trace cache within a computer architecture that is greater than an instruction execution bandwidth of the computer architecture. Results of executed branch instructions are fed back and used along with the instruction transfer bandwidth to feed correct instructions into the instruction execution pipeline of the computer architecture such that the chance of an instruction execution stall occurring within the instruction execution pipeline is greatly reduced.

Apparatus of the present invention provides a trace cache within a computer architecture to receive computer instructions at a first rate and to store the computer instructions as traces of instructions. An instruction execution pipeline is also provided to receive, decode, and execute the computer instructions at a second rate that is less than the first rate. A mux is also provided between the trace cache and the instruction execution pipeline to select a next instruction to be loaded into the instruction execution pipeline from the trace cache based, in part, on a branch result fed back to the mux from the instruction execution pipeline.

Certain embodiments of the present invention afford an approach to reduce the occurrence of stalls in an instruction execution pipeline in a computer architecture by enhancing the pipelined instruction transfer bandwidth with respect to the instruction execution bandwidth and by using trace cache to store instructions corresponding to the results of branch and jump instructions before the branch and jump instructions are executed.

These and other advantages and novel features of the present invention, as well as details of an illustrated embodiment thereof, will be more fully understood from the following description and drawings.

DETAILED DESCRIPTION OF THE INVENTION

Figure 1:
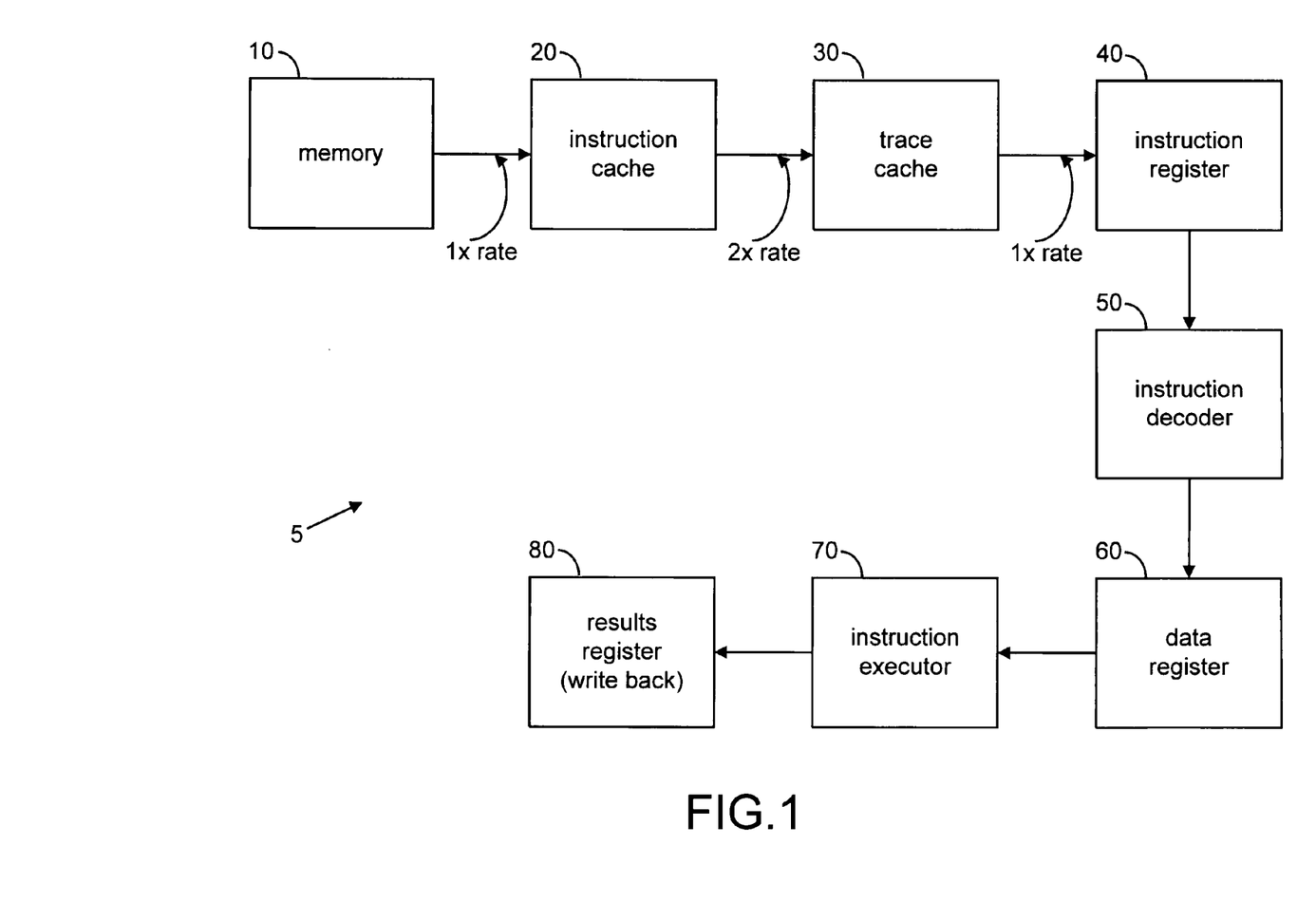
FIG. 1 is a schematic block diagram of an instruction pipeline in a computer architecture in accordance with an embodiment of the present invention.

FIG. 1 is a schematic block diagram of an instruction pipeline 5 in a computer architecture in accordance with an embodiment of the present invention. The instruction pipeline 5 comprises a memory 10, an instruction cache 20, a trace cache 30, an instruction register 40, an instruction decoder 50, a data register 60, an instruction executor 70, and a results register 80.

During operation of the instruction pipeline 5 in accordance with an embodiment of the present invention, computer instructions are loaded from memory 10 into instruction cache 20 at a first data rate of 1×. The computer instructions are loaded from instruction cache 20 into trace cache 30 at a second higher data rate of 2× (twice the 1× data rate). The instructions are loaded from trace cache 30 into instruction register 40 at the 1× data rate. Therefore, the instruction transfer bandwidth of trace cache 30 is twice that of the rest of the pipeline. This means that, for every instruction that enters the instruction register 40 to be executed, the trace cache 30 may be loaded with two new instructions from instruction cache 20.

Once an instruction is loaded into instruction register 40, it is sent to instruction decoder 50 to be decoded. Data that is associated with the decoded instruction is loaded into data register 60 and then the decoded instruction and data are executed together in instruction executor 70. When an instruction is executed, the result is written to results register 80.

For example, if an instruction to be executed is "ADD R1, R2", then the instruction register 40 would be loaded with the "ADD" instruction and decoded by instruction decoder 50. Data register 60 would be loaded with data values R1 and R2. The instruction executor 70 would perform the operation "R1+R2" and the result would be written to results register 80.

Figure 2:
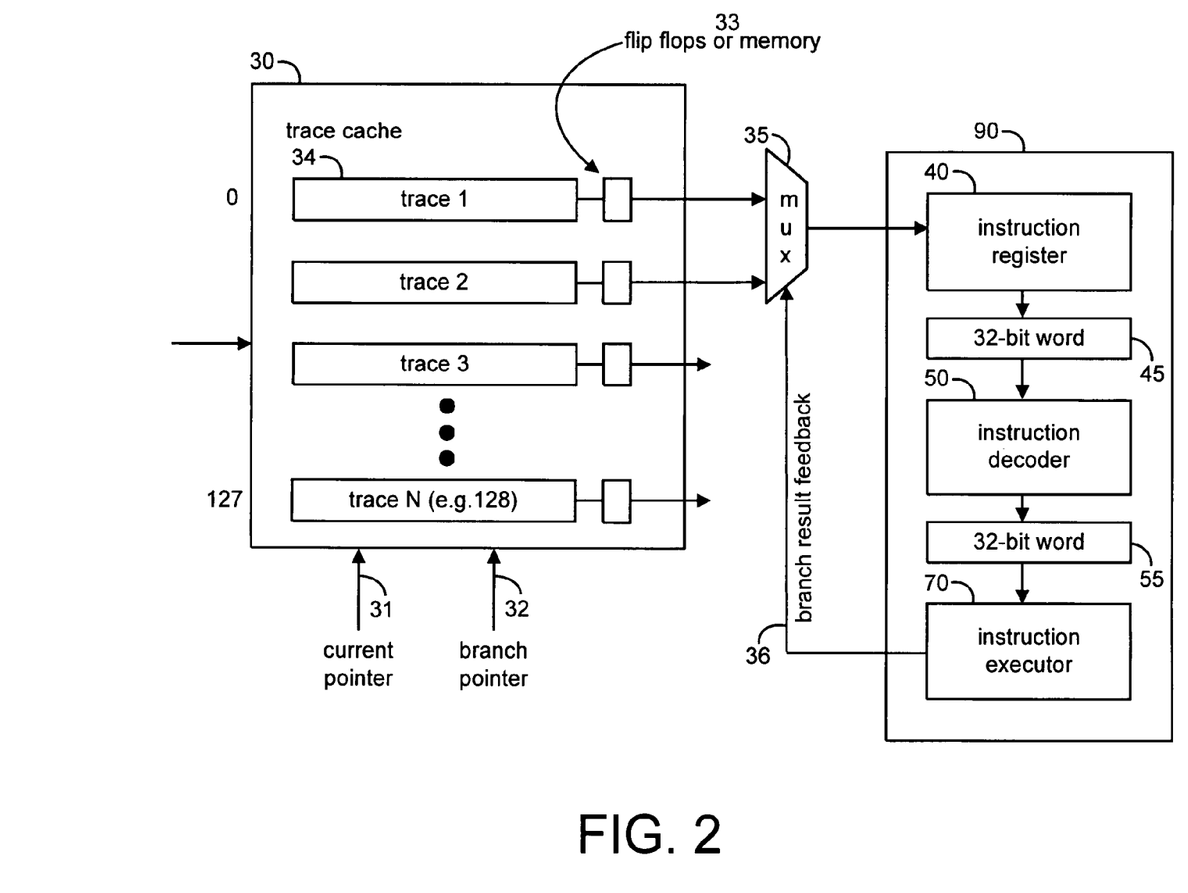
FIG. 2 is a more detailed schematic block diagram of a portion of the instruction pipeline of FIG. 1 in accordance with an embodiment of the present invention.

FIG. 2 is a more detailed schematic block diagram of a portion of the instruction pipeline of FIG. 1 in accordance with an embodiment of the present invention. Trace cache 30 may store multiple traces (e.g. trace 1 to trace 128). Instruction execution pipeline 90 is a portion of the instruction pipeline comprising instruction register 40, instruction decoder 50, and instruction executor 70 (In FIG. 2, instruction executor 70 is assumed to incorporate data register 60 and results register 80). A mux 35 interfaces trace cache 30 to instruction execution pipeline 90. In FIG. 1, the mux 35 is not explicitly shown.

Figure 3:
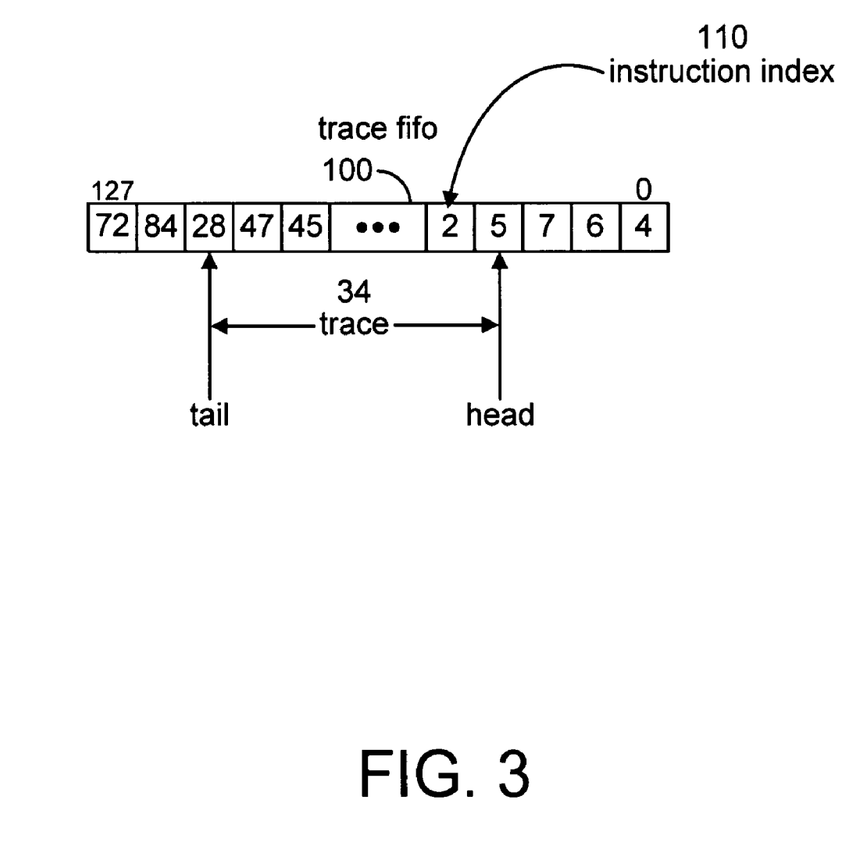
FIG. 3 is a schematic diagram of a trace fifo used in the instruction pipeline of FIG. 1 and FIG. 2 in accordance with an embodiment of the present invention.

Trace cache 30 stores multiple traces in trace FIFO's. FIG. 3 is an exemplary illustration of a trace FIFO 100 in accordance with an embodiment of the present invention. The trace FIFO 100 stores multiple computer instructions at various instruction indexes (e.g. instruction index 110) within the FIFO 100. A particular string of instructions may form a trace 34 within the trace FIFO 100 over a number of instruction indexes. In FIG. 3, trace FIFO 100 includes 128 (0 to 127) instruction indexes and may, therefore, store up to 128 computer instructions.

The various traces that are stored in trace cache 20 are built up over time as the instruction pipeline is in operation. Traces are constructed within trace cache 30 according to the programmed instruction sequences and a set of rules that govern how to load trace cache from instruction cache when conditional branch instructions and unconditional jump instructions are encountered. In an embodiment of the present invention, trace cache 30 is managed by a free list manager (not shown) and a trace FIFO manager (not shown) in order to free up any unused traces and/or instruction indexes and load new traces or individual instructions in the freed up locations.

The instruction transfer bandwidth of the trace cache 30 is greater than the instruction execution bandwidth of the instruction execution pipeline 90 and the overall instruction pipeline 5. In an embodiment of the present invention, two instructions may be loaded into trace cache for a single clock cycle of the instruction pipeline whereas only one instruction is loaded from memory 10 to instruction cache 20 during a single clock cycle and only one instruction is clocked through each stage of the instruction execution pipeline 90 for each clock cycle.

Figure 4:
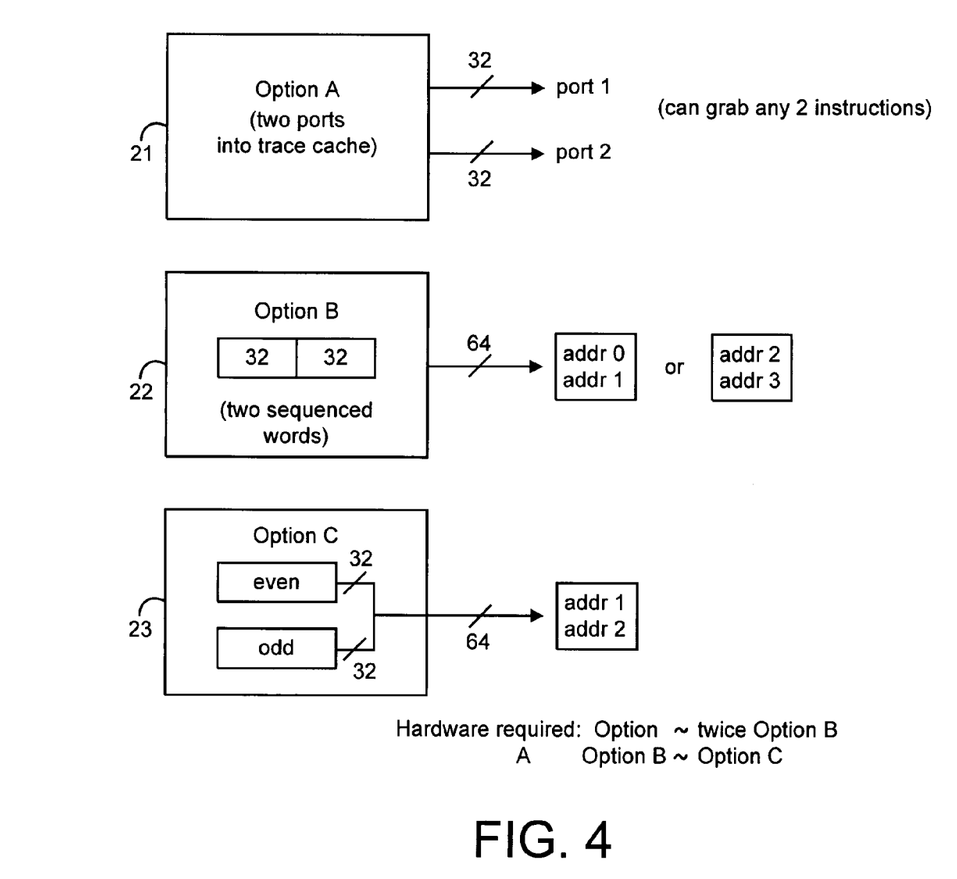
FIG. 4 is an illustration of several possible options for achieving an enhanced data transfer rate between instruction cache and trace cache in the instruction pipeline of FIG. 1 in accordance with possible embodiments of the present invention.

FIG. 4 is an illustration of several possible options for achieving an enhanced data transfer rate (bandwidth) between instruction cache and trace cache in the instruction pipeline of FIG. 1 in accordance with possible embodiments of the present invention. In option A 21, two hardware ports may be used between instruction cache 20 and trace cache 30. Each port is able to handle one 32-bit instruction. The configuration is able to grab any two instructions from instruction cache 20 and transfer the two instructions to trace cache 30 within one clock cycle.

Option B 22 and option C 23 each use one hardware port to transfer two 32-bit instructions in one clock cycle. In the case of option B 22, two sequenced 32-bit words may be transferred at one time corresponding to two successive address locations within instruction cache 20. For example, address 0 and address 1 may be transferred within one clock cycle and address 2 and address 3 may be transferred within the next clock cycle. However, address 1 and address 2 may not be transferred together within the same clock cycle in the option B configuration. Option A 21 would allow address 1 and address 2 to be transferred within the same clock cycle using the two ports.

Option C 23 relies on arranging addresses in an even and odd configuration and requiring that, during a given clock cycle, one even and one odd instruction be transferred. As a result, address 0 (even) and address 1 (odd) may be transferred together, address 2 (even) and address 3 (odd) may be transferred together, and address 1 (odd) and address 2 (even) may be transferred together. Option C 23, like option B 22 uses only one hardware port and, therefore, requires less hardware than Option A 21.

Therefore, it may be seen that options A, B, and C each allow two instructions to be transferred from instruction cache 20 to trace cache 30 within one clock cycle, resulting in an instruction transfer bandwidth between the two caches that is twice the overall instruction pipeline bandwidth. However, each option requires making different tradeoffs between configuration complexity and flexibility of instruction transfers.

Figure 5:
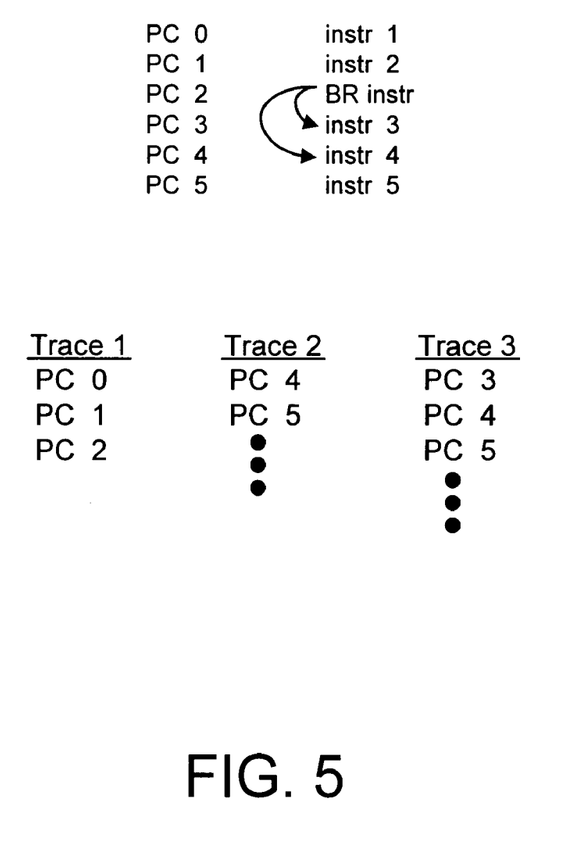
FIG. 5 is an exemplary illustration of a program counter sequence with a branch instruction and comprising three traces of instructions in accordance with an embodiment of the present invention.

FIG. 5 is an exemplary illustration of a program counter sequence with a branch instruction and comprising three traces of instructions in accordance with an embodiment of the present invention. When the program counter of the computer architecture gets to PC 2, a branch instruction is encountered. Depending on the result of the branch instruction, the program counter will either go next to PC 3 (no branching) and the next instruction (instr 3) will be executed, or the program counter will branch to PC 4, skipping instr 3 and executing instr 4.

The possible sequences of instructions may be represented in trace cache as three separate traces (trace 1, trace 2, and trace 3) as shown in FIG. 5. Trace 1 is executed through and including the branch instruction at PC 2. If the result of the branch instruction is to branch, then trace 2 is loaded from trace cache 30 into the instruction execution pipeline 90 where instructions 4 and 5 are executed next. If the result of the branch instruction is not to branch, then trace 3 is loaded from trace cache 30 into instruction execution pipeline 90 where instructions 3, 4, and 5 are executed next.

Again, FIG. 5 is an ideal illustration that assumes that, after a branch instruction is executed, the next instruction that is executed is based on the result of the branch instruction. However, in a real pipelined architecture, branch delay slots are often used to prevent stalls of the instruction execution pipeline. When branch delay slots are used, the next instruction executed after a branch instruction is not necessarily the result of the branch instruction. For example, for a single branch delay slot implementation, the instruction in the sequence immediately after the branch instruction will always be executed, whether or not the result of the branch instruction is to branch or not.

Referring again to FIG. 2, in an embodiment of the present invention, a current pointer 31 points to the current trace of instructions that is being fed into instruction execution pipeline 90. When a branch instruction enters instruction execution pipeline 90, a branch pointer points to a branch trace 32 corresponding to the branch instruction. When the branch instruction is executed by instruction executor 70, the result of the branch instruction 36 is fed back to the mux 35. Flip flops or memory 33 contain the next instruction corresponding to the current pointer 31 and the next instruction corresponding to the branch pointer 32. The fed back branch result 36 selects the next instruction to load through the mux 35 into instruction register 40.

If the result of the branch instruction is not to branch, then the next instruction that is loaded is the next instruction in the trace that the current pointer 31 is pointing to. If the result of the branch instruction is to branch, then the next instruction that is loaded is the next instruction in the trace that the branch pointer 32 is pointing to.

As a result, only correct next instructions are ever loaded into the instruction register 40 of the instruction execution pipeline 90. The increased instruction transfer bandwidth into trace cache 30 ensures that both instruction options corresponding to branching or not branching are both present in trace cache before the branch instruction is actually executed. Therefore, no branch predictors are needed and the computer architecture generally does not ever have to go further back in the instruction pipeline architecture further than trace cache to get the next correct instruction to be executed. As a result, the possibility of a stall in the instruction execution pipeline due to a branch instruction is reduced. Similarly, for an unconditional jump instruction, when the unconditional jump instruction is loaded into instruction register 40, trace cache is loaded with the trace corresponding to the jump instruction before the jump instruction is executed by the instruction executor 70.

Figure 6:
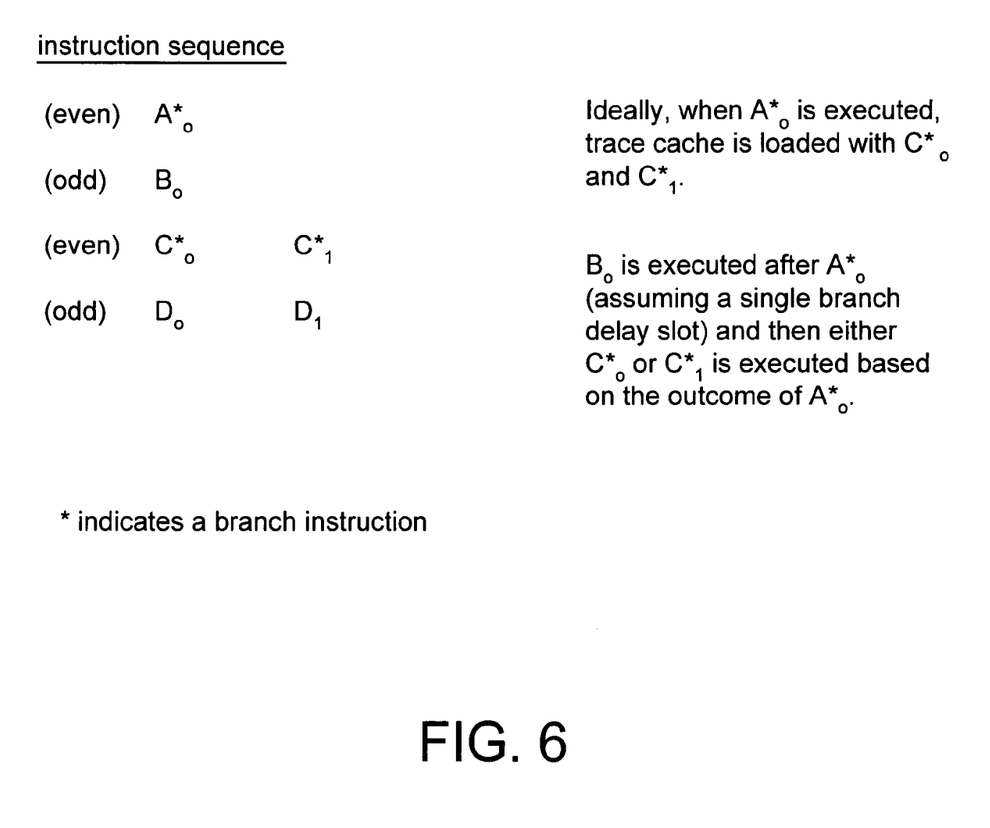
FIG. 6 is an exemplary illustration of an ideal instruction sequence with branch instructions and a single branch delay slot in accordance with an embodiment of the present invention.

FIG. 6 illustrates a sequence of even and odd instructions. In an ideal scenario, when $A^*_0$, a branch instruction, is loaded into instruction register 40, trace cache 30 is loaded with instructions $C^*_0$ and $C^*_1$. $C^*_0$ and $C^*_1$ are the possible outcome instructions of branch instruction $A^*_0$. Instruction $B_0$ is a single branch delay instruction that is executed in the instruction execution pipeline before either $C^*_0$ or $C^*_1$ are executed. As a result, after $A^*_0$ is executed in instruction executor 70, $B_0$ is then decoded and loaded into the instruction executor 70 to be executed and either $C^*_0$ or $C^*_1$ may be loaded into the instruction register 40 based on the outcome of the branch instruction $A^*_0$.

Depending on the configuration of the interface between the instruction cache 20 and trace cache 30 (see FIG. 4), however, instructions $C^*_0$ and $C^*_1$ may not be able to be loaded into trace cache 30 at the same time (i.e. in a single clock cycle) if they do not correspond to sequential address locations within instruction cache 20. Option B 22 of FIG. 4, for example, may preclude the loading of $C^*_0$ and $C^*_1$ at the same time.

Figure 7:
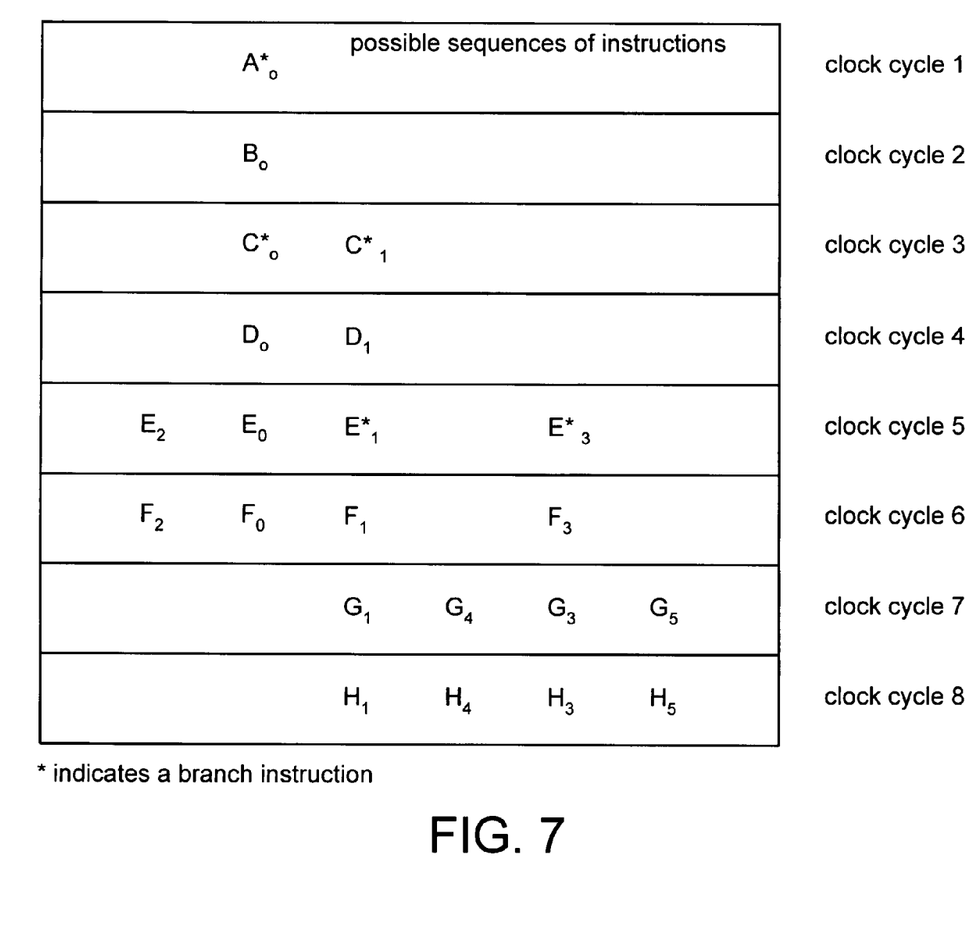
FIG. 7 is an exemplary illustration of several possible sequences of instructions with branch instructions over eight clock cycles in accordance with an embodiment of the present invention.
Figure 8:
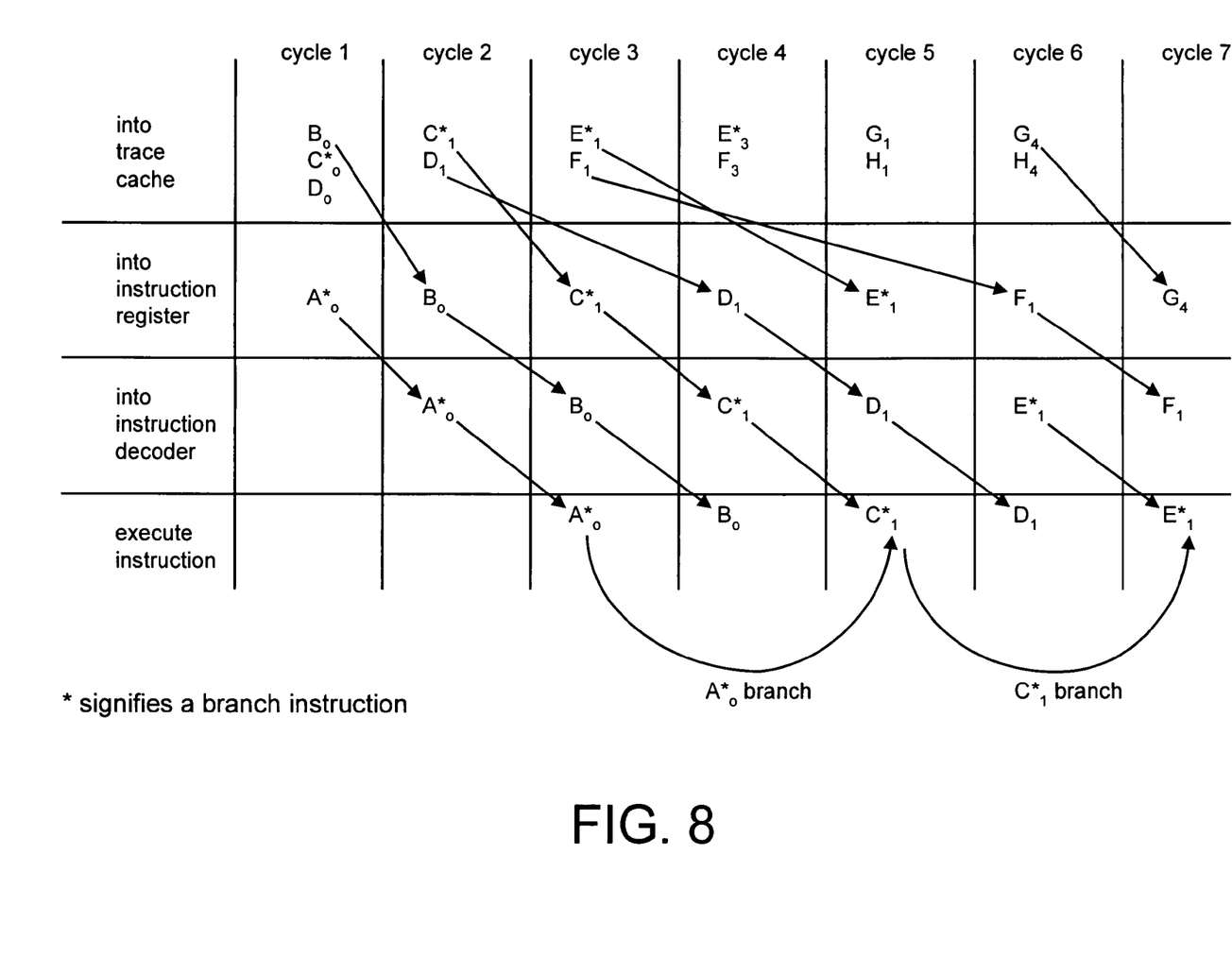
FIG. 8 is an exemplary illustration of executing a particular path through the sequence of instructions of FIG. 7 using the instruction pipeline of FIG. 2 in accordance with an embodiment of the present invention.

FIG. 7 and FIG. 8 illustrate a sequence of events in an instruction pipeline in accordance with an embodiment of the present invention where, for example, $C^*_0$ and $C^*_1$ may not be loaded into trace cache at the same time. FIG. 7 shows a set of possible sequences of instruction paths that may be taken over eight clock cycles. FIG. 8 illustrates one such possible path taken and how the various instructions are loaded into trace cache 30 and piped through the instruction execution pipeline 90 in accordance with an embodiment of the present invention. As may be seen in FIG. 2, the instructions are piped through the instruction execution pipeline as 32-bit words 45 and 55 according to an embodiment of the present invention.

The example starts off with $B_0$, $C^*_0$, and $D_0$ loaded into trace cache 30 from instruction cache 20 when branch instruction $A^*_0$ is loaded into instruction register 40 during clock cycle 1 as shown in FIG. 8. $C^*_0$ and $C^*_1$ are the possible next instructions to be executed as a result of branch instruction $A^*_0$.

In clock cycle 2, $A^*_0$ is decoded in instruction decoder 50 and $B_0$ is loaded into instruction register 40 since $B_0$ is a branch delay slot instruction and must be executed before either $C^*_0$ or $C^*_1$. Also in clock cycle 2, $C^*_1$ and $D_1$ are loaded into trace cache 30 from instruction cache 20. In the example of FIG. 8, it is assumed that $C^*_0$ and $C^*_1$ are even instructions but are not in sequential address locations. Also, it is assumed that $D_0$ and $D_1$ are odd instructions but are not in sequential address locations. It is assumed that $C^*_0$ and $D_0$ are in sequential address locations and $C^*_1$ and $D_1$ are in sequential address locations.

In clock cycle 3, $A^*_0$ is executed in instruction executor 70, $B_0$ is decoded in instruction decoder 50, and $C^*_1$ is loaded into instruction register 40 from trace cache 30. In this example, $C^*_1$ was the result of the branch instruction $A^*_0$ and was selected by feedback signal 36 through mux 35. Also in clock cycle 3, $E^*_1$ and $F_1$ are loaded into trace cache.

Continuing with the example of FIG. 8, in clock cycle 4, $B_o$ is executed, $C^*_1$ is decoded, and $D_1$ is loaded from trace cache 30 into instruction register 40 since $D_1$ is a branch delay slot instruction that must be executed before either $E^*_1$ or $E^*_3$, the possible outcomes of branch instruction $C^*_1$, are executed. Also in clock cycle 4, $E^*_3$ and $F_3$ are loaded into trace cache 30.

In clock cycle 5, $C^*_1$ is executed, $D_1$ is decoded, and $E^*_1$ (the result of branch instruction $C^*_1$ in this example) is loaded into instruction register 40, again selected with the feedback signal 36 through the mux 35. Also in clock cycle 5, $G_1$ and $H_1$ are loaded into trace cache.

In clock cycle 6, $D_1$ is executed, $E^*_1$ is decoded, $F_1$ is loaded into instruction register 40 since $F_1$ is a branch delay slot instruction and must be executed after branch instruction $E^*_1$. Also in clock cycle 6, $G_4$ and $H_4$ or loaded into trace cache.

In clock cycle 7, $E^*_1$ is executed, $F_1$ is decoded, and $G_4$ is loaded into instruction register 40. It is assumed in the example that $G_4$ is the result of branch instruction $E^*_1$.

It may be seen from the following example that the next correct instruction that needs to be loaded into instruction register 40 is always available from trace cache 30 during the appropriate clock cycle. The computer architecture generally does not have to wait to go back to instruction cache 20 or memory 10 in order to retrieve a next instruction to be put into the instruction execution pipeline. As a result, the occurrence of instruction stalls in the instruction execution pipeline 90 are greatly reduced if not totally eliminated.

Other embodiments of the present invention are not restricted to a single branch delay slot or to an instruction transfer bandwidth that is only double that of the overall instruction pipeline bandwidth. For example, one embodiment could load trace cache with three instructions in a single clock cycle even though only one instruction is actually executed in a single clock cycle.

The various elements of the instruction pipeline 5 may be combined or separated according to various embodiments of the present invention. For example, data register 60 and results register 80 may be integrated into instruction executor 70. Also, mux 35 could be integrated into instruction execution pipeline 90.

In summary, certain embodiments of the present invention afford an approach to reduce instruction pipeline stalls in a computer architecture due to branch and jump instructions. The occurrence of instruction execution pipeline stalls are reduced by enhancing the pipelined instruction transfer bandwidth with respect to the instruction execution bandwidth and by storing all possible instruction outcomes, associated with any particular branch or jump, in trace memory before execution of the particular branch or jump instruction.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. In a computer architecture for executing computer instructions, a method to reduce the occurrence of instruction execution pipeline stalls due to branch instructions and jump instructions, said method comprising:
   providing an instruction transfer bandwidth into a trace cache of said computer architecture that is greater than an instruction execution bandwidth of said computer architecture;
   utilizing said instruction transfer bandwidth to provide both the taken and not taken paths of a branch to the trace cache;
   feeding back branch results of executed branch instructions to control the transmission of correct next instructions into the execution pipeline; and
   using branch delay slots to postpone the execution of said next instruction during said transmission such that the occurrence of instruction execution stalls within said instruction execution pipeline is reduced.

2. The method of claim 1 further comprising providing at least one of said branch delay slots for each of said branch instructions.

3. The method of claim 1 wherein said instruction transfer bandwidth is at least twice said instruction execution bandwidth.

4. The method of claim 1 wherein said instruction execution bandwidth corresponds to one instruction per clock cycle of said computer architecture.

5. The method of claim 1 wherein said instruction transfer bandwidth corresponds to at least two instructions per clock cycle of said computer architecture.

6. The method of claim 1 wherein any fed-back branch result of said branch results determines which of two possible instructions is transferred next into said instruction execution pipeline for subsequent execution.

7. The method of claim 1 wherein at least two instructions are transferred from an instruction cache of said computer architecture to said trace cache of said computer architecture during a single instruction execution time.

8. The method of claim 1 wherein a current pointer is pointing to a current trace of instructions within said trace cache of said computer architecture when an instruction of said current trace is within said instruction execution pipeline.

9. The method of claim 1 wherein a branch pointer is updated to point to a branch trace of instructions within said trace cache based on a branch instruction within a current trace of instructions to be executed.

10. The method of claim 1 wherein any fed-back branch result of said branch results determines which trace in said trace cache is to be loaded next into said instruction execution pipeline.

11. In a computer architecture for executing computer instructions, an apparatus to reduce the occurrence of instruction execution pipeline stalls due to branch instructions and jump instructions, said apparatus comprising:

a trace cache that receives computer instructions at a first rate and stores said computer instructions as traces of instructions, including both taken and not taken paths of branches;

an instruction execution pipeline that receives, decodes, and executes computer instructions at a second rate that is less than said first rate;

a selector that selects a next instruction to be loaded into said instruction execution pipeline from said trace cache based, in part, on a branch result fed back from said instruction execution pipeline as a control to said selector to transmit correct next instructions into the execution pipeline; and wherein said instruction execution pipeline uses branch delay slots to postpone the execution of said next instruction during said transmission such that the occurrence of instruction execution stalls within said instruction execution pipeline is reduced.

12. The apparatus of claim 11 wherein said instruction execution pipeline comprises:

an instruction register that receives said next instruction from said trace cache by way of said selector;

an instruction decoder that receives said next instruction from said instruction register and generates a decoded instruction; and an instruction executor that receives said decoded instruction from said instruction decoder and executes said decoded instruction.

13. The apparatus of claim 12 wherein said instruction executor comprises:

a data register that stores data words associated with said decoded instruction; and a results register that stores a result of executing said decoded instruction using said data words.

14. The apparatus of claim 11 further comprising;

instruction cache that sends said computer instructions to said trace cache at said first rate; and memory that sends said computer instructions to said instruction cache at said second rate.

15. The apparatus of claim 11 wherein said branch result is generated by the execution of a branch instruction.

16. The apparatus of claim 11 wherein said second rate corresponds to one instruction per clock cycle of said computer architecture.

17. The apparatus of claim 11 wherein said instruction execution pipeline accommodates at least one of said branch delay slots for each branch instruction.

18. The apparatus of claim 11 wherein said first rate corresponds to at least two instructions per clock cycle of said computer architecture.

19. The apparatus of claim 14 wherein at least two instructions are transferred from said instruction cache to said trace cache based on said branch result.

20. The apparatus of claim 12 wherein a current pointer points to a current trace of instructions within said trace cache to be executed and a branch pointer points to a branch trace of instructions within said trace cache based on a branch instruction of said current trace of instructions to be executed.

* * * * *